(12) United States Patent
Craig et al.

(10) Patent No.: US 8,344,945 B2
(45) Date of Patent: Jan. 1, 2013

(54) SYSTEM FOR SIMPLIFICATION OF RECONFIGURABLE BEAM-FORMING NETWORK PROCESSING WITHIN A PHASED ARRAY ANTENNA FOR A TELECOMMUNICATIONS SATELLITE

(75) Inventors: Antony Duncan Craig, Hitchin (GB); Simon John Stirland, Hitchin (GB)

(73) Assignee: Astrium Limited, Hertfordshire (GB)

( * ) Notice: Subject to any disclaimer, the term of this patent is extended or adjusted under 35 U.S.C. 154(b) by 129 days.

(21) Appl. No.: 12/669,738

(22) PCT Filed: Jul. 18, 2008

(86) PCT No.: PCT/GB2008/050593
§ 371 (c)(1),
(2), (4) Date: Jan. 19, 2010

(87) PCT Pub. No.: WO2009/013527
PCT Pub. Date: Jan. 29, 2009

(65) Prior Publication Data
US 2010/0194629 A1    Aug. 5, 2010

(30) Foreign Application Priority Data

Jul. 20, 2007 (GB) .................................. 0714179.9
Jul. 20, 2007 (GB) ................................. 07252896.1

(51) Int. Cl.
*H04B 7/185* (2006.01)
*H01Q 3/00* (2006.01)
(52) U.S. Cl. .......................... 342/354; 342/372; 342/373
(58) Field of Classification Search .................. 342/354, 342/368, 372, 373
See application file for complete search history.

(56) References Cited

U.S. PATENT DOCUMENTS

| 4,257,050 A | 3/1981 | Ploussios |
| 4,642,645 A | 2/1987 | Haupt |

(Continued)

FOREIGN PATENT DOCUMENTS

EP    0917240    5/1999

(Continued)

OTHER PUBLICATIONS

Japanese Office Action issued in Japanese Patent Application No. 2009-524241, mailed on May 17, 2011 and an English translation thereof.

(Continued)

*Primary Examiner* — Dao Phan
(74) *Attorney, Agent, or Firm* — Pearl Cohen Zedek Latzer, LLP

(57) ABSTRACT

A telecommunications satellite having a phased array antenna, wherein the beam-forming function within the phased array is simplified by partitioning it into two stages, in which the sub-array stage relates to a fixed, or infrequently changed, set of overlapping sub-arrays and the main stage provides the main pattern reconfiguration, typically in the form of multiple reconfigurable spot beams within a defined coverage region. The key advantage lies in the significant reduction in number of second stage beam-forming control points (at which independent amplitude and phase is applied) when compared with a conventional phased array (where amplitude and phase control is applied for each element of the array). The sub-array stage beam-forming may be implemented in analogue technology. The main beam-former may be implemented in digital technology, where the key processing functions of A/D or D/A conversion, frequency (de)multiplexing and digital beam-forming all scale with the number of control points.

35 Claims, 13 Drawing Sheets

U.S. PATENT DOCUMENTS

| | | | |
|---|---|---|---|
| 5,764,187 A | 6/1998 | Rudish et al. | |
| 6,018,316 A | 1/2000 | Rudish et al. | |
| 6,336,033 B1 | 1/2002 | Yamaguchi et al. | |
| 6,504,516 B1 | 1/2003 | Davis | |
| 6,559,797 B1 | 5/2003 | Chang | |

FOREIGN PATENT DOCUMENTS

| | | |
|---|---|---|
| EP | 1348978 | 10/2003 |
| EP | 1 742 081 A2 | 1/2007 |
| JP | 11-068443 | 3/1999 |
| JP | 2001-133538 | 11/1999 |
| JP | 2003-284128 | 3/2002 |
| WO | WO 98/32188 | 7/1998 |
| WO | WO98/56068 | 12/1998 |
| WO | WO 2007/103589 | 9/2007 |

OTHER PUBLICATIONS

International Search Report for International Application No. PCT/GB2008/050593 mailed on Jan. 9, 2008.

European Search Report for European Application No. EP 07 25 2896 completed on Sep. 27, 2007.

Search Report for Great Britain Application No. GB0714179.9 completed on Oct. 10, 2007.

Herd, J.S. et al., "Design Considerations and Results for an Overlapped Subarray Radar Antenna" IEEE Aerospace Conference 2005, pp. 1087-1092.

Japanese Office Action issued in Japanese Patent Application No. 2009-524241, mailed on Aug. 30, 2011 and an English translation thereof.

-contours 5,15,25,30,32,33 dBi

Figure 10: overlapping sub-arrays of 2X2 cells (72 elements)

Contours are 30,35,40,45,48,50.4,51.4,52.6 dBi

SYSTEM FOR SIMPLIFICATION OF RECONFIGURABLE BEAM-FORMING NETWORK PROCESSING WITHIN A PHASED ARRAY ANTENNA FOR A TELECOMMUNICATIONS SATELLITE

CROSS-REFERENCE TO RELATED APPLICATIONS

This application is a National Phase Application of PCT International Application No. PCT/GB2008/050593, International Filing Date Jul. 18, 2008, claiming priority of Great Britain Patent Application No. 0714179, filed Jul. 20, 2007, and of European Application No. 07252896 filed Jul. 20, 2007, all of which are incorporated hereby by reference.

TECHNICAL FIELD

The present invention relates in general to beam-forming of a phased array antenna for a telecommunications space craft, and in particular relates to the simplification of reconfigurable beam-forming network processing within a phased array antenna for a telecommunications satellite.

BACKGROUND ART

A clear trend in satellite communications is towards the use of multiple spot beam coverage in order to provide high gain (to reduce power and operate with small terminals) and to support spatial frequency reuse (to increase throughput within bandwidth constrained systems). It is known accurately to define such narrow spot beams, with a multi-element antenna system, by digital beam-forming techniques involving assigning complex digital weights to the elements for each communication frequency channel for controlling spot beam parameters: see A. M. Bishop et al "The INMARSAT 4 Digital Processor and Next Generation Developments", 23rd AIAA ICSSC, Rome, Italy, September 2005. An ongoing problem is that, although there are continual improvements in enabling digital processor technologies, there are continually increasing demands in terms of beam-forming and associated processing associated with the need to provide larger numbers of narrower spot beams operating over broader bandwidths.

An important class of antenna which may provide such coverage is the phased array antenna, either in its direct radiating array (DRA) or imaged radiating array (IRA) form. In the case of a DRA, the antenna may be comprised of a two-dimensional matrix of antenna elements, typically but not necessarily identical, each antenna element having a respective element signal (operating in either transmit or receive mode). In an IRA, the aperture diameter of a primary DRA is magnified by means of antenna "optics" (e.g. parabolic reflectors). For the purposes of the present specification, the term "phased array antenna" includes a DRA, IRA and other arrays, having a plurality of antenna elements, each of which provides an antenna element signal having a phase relationship and an amplitude relationship to the other element signals. Phased array antennas offer high performance in terms of flexibility and reconfigurability resulting from control of element amplitude and phase weights within a beam-forming network. But it is also well known that phased arrays are complex, massive and expensive. Compared with alternative antenna types, for instance array-fed reflectors (AFR), they typically require many more radiating elements and thus much greater beam-forming complexity and cost.

A beam-forming network provides reconfigurable amplitude and phase control (equivalent to complex weights in the digital domain) for each antenna element (and potentially on an individual frequency channel basis) such that beam-forming complexity scales with the number of elements. Even the next generation of on board digital processors cannot support the complexity needed to provide fully flexible beam-forming for a phased array designed to generate (for instance) beams of diameter 0.5° covering Europe at a frequency of 20 GHz with a bandwidth of 500 MHz, which is a current commercial requirement.

It is known to simplify phased array antenna construction in various ways. In particular, it is known to partition phased array antennas into sub-arrays, and this may offer simplifications in construction and signal processing.

Overlapping sub-arrays are described in "Design Considerations and Results for an Overlapped Sub-array Radar Antenna", Jeffrey S. Herd et al, 2005 IEEE Aerospace Conference, pp. 1087-1092.

SUMMARY OF THE INVENTION

The present invention provides, in a first aspect, a method of beam-forming for an antenna of a telecommunications spacecraft, the antenna comprising a phased array antenna, and the antenna providing a plurality of communications beams within a predefined geographical region, the method comprising:

providing the phased array antenna as a plurality of antenna elements, each antenna element having an antenna element signal having a phase relationship and an amplitude relationship to the other element signals, and partitioning said antenna elements into a plurality of overlapping sub-arrays, each sub-array comprising a subset of all the antenna elements of the phased array, and at least some or all the antenna elements participating in more than one sub-array, allocating to elements of each sub-array respective sub-array beam-forming weights, and allocating to each sub-array respective main beam-forming weights for said plurality of beams such that the composite radiation pattern of the antenna provides said plurality of beams within said region, In a second aspect, the invention provides a phased array antenna of a telecommunications spacecraft, for providing coverage over a predefined geographical region, and the antenna providing a plurality of communications beams within said region, and comprising:

a plurality of antenna elements, each antenna element having an antenna element signal having a phase relationship and an amplitude relationship to the other element signals, and said antenna elements being partitioned into a plurality of overlapping sub-arrays, each sub-array comprising a subset of all the antenna elements of the phased array, and at least some of the antenna elements participating in more than one sub-array, a sub-array beam-forming network which allocates to elements of each sub-array respective sub-array beam-forming weights, and a main beam-forming network which allocates to each sub-array main beam-forming weights for each of said plurality of communications beams such as to produce said plurality of communications beams within said region.

For the purposes of the present specification, the term "subset", is intended to mean a group of some, but not all, of the antenna elements.

In a common situation, all of the antenna elements will participate in more than one sub-array, apart from some at the edges of the antenna.

The term "directivity" is well understood by those skilled in the art, but for the avoidance of doubt, it is to be understood herein as a property of the radiation pattern produced by an antenna. In the transmit case it may be regarded as the ratio of the antenna power flux density in a given direction to the power flux density that would be produced if the antenna pattern were to be isotropic. It is often expressed in dBi (decibels isotropic).

The communications beams produced in accordance with the invention may be spot-beams, having a very narrow width; in the example below, a diameter of 0.5° is achieved.

Said predefined geographical region may not comprise a single, connected region. It could be reconfigurable from a connected area (say Europe), to several disconnected areas (say subset of Europe plus Canary Islands), or even be fixed on a plurality of disconnected areas. By providing the beamformer at sub-array level with multiple outputs, the antenna could provide coverage of two or more independently reconfigurable regions.

The phased array antenna of the present invention may be used as a receive antenna, a transmit antenna, or for both functions of receive and transmit. Each said sub-array has a port (alternatively herein "control point", —for determining beam-forming weights), which functions as an output port where the antenna is in receive mode, and as an input port where the antenna is in transmit mode. In the case of receive mode, each sub-array includes a summation function to combine the weighted element signals of the sub-array into a single output, and in the case of the transmit function, each sub-array includes a division function for distributing a single input to each of the element weights.

The weight values provided in accordance with the invention will be complex values, having real and imaginary components in digital form, equivalent to having amplitude and phase information $(A, \phi)$ where the weights are in analogue form.

A further aspect of this invention relates to a phased array antenna, formed as a plurality of overlapping sub-arrays, having an optimised formation of beams within a predefined geographical region, and a process for optimising the beam-forming characteristics of such phase array antenna.

Accordingly, the present invention provides, in a third aspect, an optimisation process for determining beam-forming parameters of a phased array antenna, the antenna providing coverage over a predefined geographical region, and providing a plurality of beams within said region, the antenna having a plurality of antenna elements, each antenna element providing an antenna element signal having a phase relationship and an amplitude relationship to the other element signals, and the antenna elements being partitioned into a plurality of overlapping sub-arrays, each sub-array comprising a subset of all the antenna elements of the phased array, and at least some of the antenna elements participating in more than one sub-array, the optimisation process comprising:

a first step in which sub-array beam-forming weights allocated to elements of each said sub-array are set to initial values, and a second step in which main beam-forming weight values allocated to said sub-arrays are determined, to provide values of directivity at the locations of at least some of said beams; and iterating said first and second steps, involving changing the values of said sub-array beam-forming weights, until a desired level of said directivity for said beams is attained.

In a fourth aspect, the invention provides a phased array antenna, the antenna providing coverage over a predefined geographical region, and providing a plurality of beams within said region, the antenna having a plurality of antenna elements, each antenna element providing an antenna element signal having a phase relationship and an amplitude relationship to the other element signals, and the antenna elements being partitioned into a plurality of overlapping sub-arrays, each sub-array comprising a subset of all the antenna elements of the phased array, and at least some of the antenna elements participating in more than one sub-array, wherein sub-array beam-forming weights allocated to each said sub-array have been optimised in order to attain a desired level of said directivity for said plurality of beams by means of an optimisation process wherein said sub-array beam-forming weights are changed in value in iterations, and at each iteration main beam-forming weight values allocated to said sub-arrays are determined.

A feature of the optimisation in accordance with the invention, is that the optimisation involves determining values of directivity by means of main beam-forming weight values, at each iteration of the values of the sub-array beam-forming weights.

As preferred, all or at least some of said beams has a said desired value of directivity, which is at least a predetermined minimum value, as will be made clear below.

Further said sub-arrays are desirably essentially identical to one another, in particular with essentially similar weight sets, with amplitudes and phases allocated to corresponding antenna elements, and in particular having a similar geometric configuration. This need not be the case, however: the sub-arrays need not comprise contiguous sets of elements, and the sub-arrays need not have identical sets of amplitudes and phases implemented on them. In fact if the sub-arrays are implemented as being reconfigurable via MEMS or similar components, they may be different from one another, but at the cost of increased optimisation steps. Further, the underlying array itself need not comprise elements disposed on a regular grid, nor of a regular polygonal outline, nor identical elements.

Thus, the invention provides a scheme by which the beam-forming function within a phased array may be simplified by partitioning it into two stages, in which the sub-array stage (adjacent to the physical array) relates to a fixed, or infrequently changed, set of overlapping sub-arrays and the main stage provides the main pattern reconfiguration, typically in the form of multiple reconfigurable spot beams within a defined coverage region. A key advantage lies in the significant reduction in number of main beam-forming stage control points (at which independent amplitude and phase signals are applied) when compared with a conventional phased array (where amplitude and phase control is applied for each element of the array). In the case that the main beam-forming and associated processing is performed digitally, the reduction in the number of main beam-forming control points simplifies the processing to the extent that the implementation is made feasible within the limits of current digital technology.

The sub-array beam-forming may be implemented in analogue or digital technology but preferably would use analogue technology. The main beam-former stage may be similarly implemented in analogue or digital technology but the main advantages relate to digital systems where the key processing functions of ND or D/A conversion, frequency (de) multiplexing and digital beam-forming all scale with the number of control points. Though the invention lends itself naturally to a hybrid analogue/digital beam-forming implementation, this is not a necessary feature. Either all-analogue or all-digital versions of the invention would be feasible.

BRIEF DESCRIPTION OF THE DRAWINGS

A preferred embodiment of the invention will now be described with reference to the accompanying drawings, wherein.

DESCRIPTION OF THE PREFERRED EMBODIMENTS

Direct radiating phased arrays have an element spacing chosen so that they do not generate grating lobes within some defined field of view. For satellites operating in geostationary orbit it is usually necessary (for interference mitigation) to keep grating lobes off the earth. This, together with the need usually for the antenna to be able to scan beams anywhere on the visible earth, implies that the element spacing should not exceed 2-3 wavelengths. On the other hand, the overall size of the array is determined in inverse relationship to the angular size of the beams it is designed to generate. To provide 0.5 degree spot beams, an overall aperture of approximately 2.4 m diameter may be required at the selected frequency of 20 GHz. With element spacing approximately 3.3 cm (2.2 wavelengths at 20 GHz.), more than 4000 elements are required.

It would not be practical to provide a phased array antenna specifically designed and dimensioned just to cover the European region alone, because of the above considerations. On the other hand an AFR reflector antenna (which does not suffer from the problem of grating lobes) designed to cover just the European region in which 100 beams are contained can be designed for similar performance using of the order of 150 feeds. There is clearly a huge difference in the complexity of the beam-forming arrangement needed for the two antenna architectures. This has prevented the widespread adoption of phased array technology despite the wide recognition of the phased array antenna as very flexible and reconfigurable.

One way to reduce the complexity of a phased array is to reduce the number of active control points (antenna ports) required in the phased array for determining beam-forming weights, by forming the elements into non-overlapping clusters ("sub-arrays"), typically identical sub-arrays, where the elements in each sub-array have some fixed amplitude and phase weights (often uniform amplitude, equal phase), so that the number of active control points is reduced by a factor equal to the mean number of elements in each sub-array. The disadvantage of this approach is that the scanning performance of the antenna is reduced, so that beams pointed towards the edge of the coverage region of interest suffer reduced performance. Further, the grating lobe angular spacing for the antenna now corresponds to the spacing between sub-arrays, not between individual elements, so the property of avoiding grating lobes falling onto the earth is lost.

Figure 1:
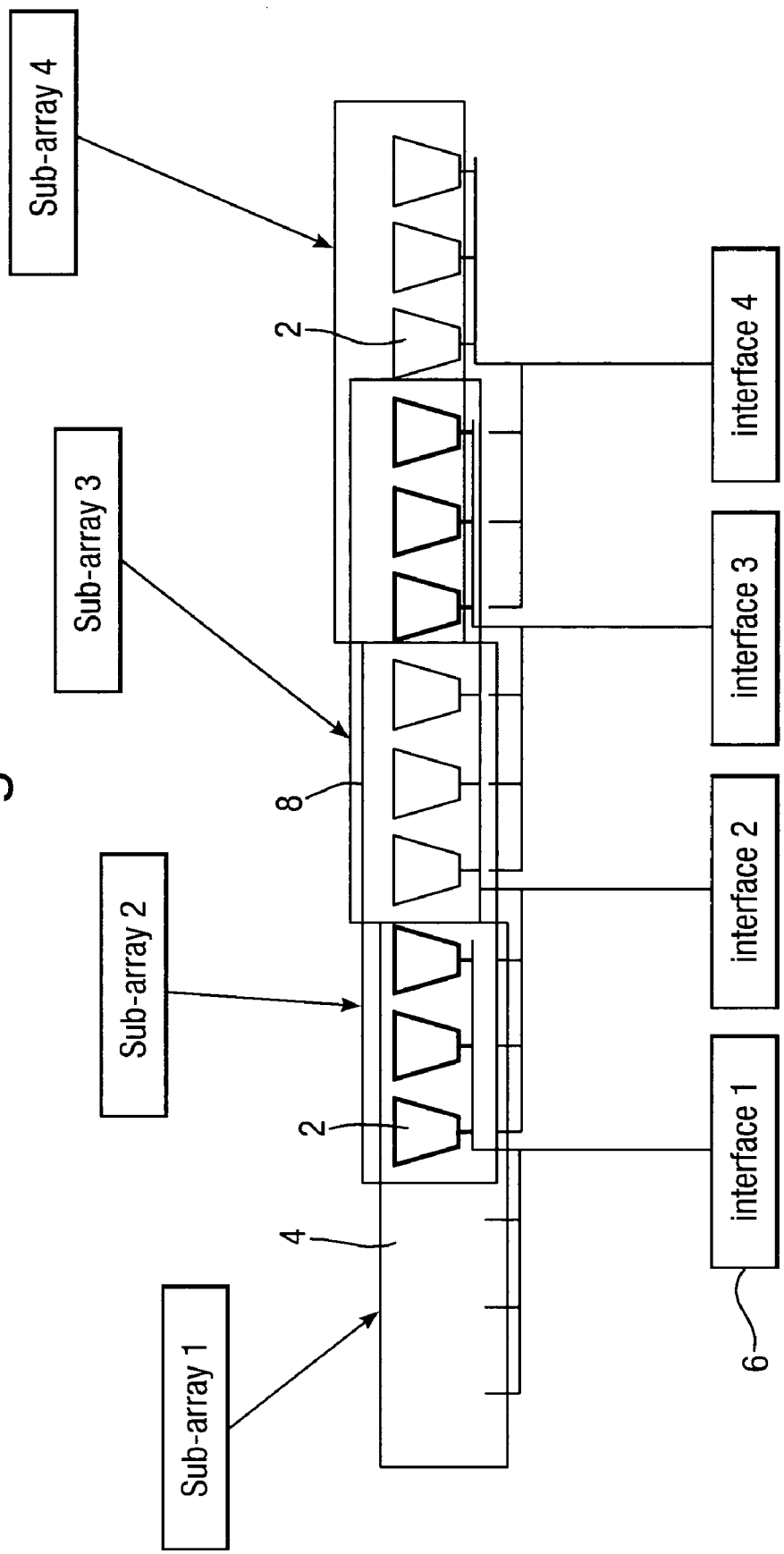
FIG. 1 is a schematic diagram illustrating a phased array antenna divided into overlapping sub-arrays.

The invention avoids both of the above disadvantages, without increasing the number of control points. This is achieved by increasing the size of the sub-arrays but not the spacing. Thus the sub-arrays "overlap", and each element participates in a number of sub-arrays. The number of control points (ports) is nevertheless reduced. Referring to FIG. 1, an example of an overlapping sub-array is shown, comprising a linear array of antenna elements 2. Four sub-arrays 4 are formed, each comprising six elements, and each having a control point/respective interface port 6. Three elements 8 from each sub-array also form part of an adjacent sub-array (on each side), so that in the major, central part of the antenna, each element (in this linear array example) participates in two sub-arrays.

The advantages of this approach are firstly that larger sub-arrays, unconstrained by their physical spacing, offer increased scope for optimisation of the pattern of the individual sub-arrays. This can include profiling of the pattern so that it provides low directivity in the area outside the coverage region, hence active suppression of grating lobes. It can also include optimisation for enhanced scan performance within the coverage region, to the point where beam scan loss may be only negligibly worse than the scan performance of the un-decimated array. The performance (within the specified region) is essentially equal to that of the full array, but the complexity of the main beam-forming is reduced by a large factor (about 20 in the example described below). The beam-level beam-forming is carried out by a greatly simplified main beam-former. The beam-forming implemented (preferably by analogue means) at sub-array level may be fixed, or could allow occasional reconfiguration (via Microscopic Electro Mechanical Systems (MEMS) or Monolithic Microwave Integrated Circuits (MMIC) components, for instance), to reconfigure the gross coverage region from one area of the earth to another, for instance from Europe to America.

Secondly, a key feature of the invention is that the complex weights on the sub-arrays themselves are customised for the coverage required. The sub-array weights may, for example, be optimised specifically for the detailed shape of European coverage, with the result that scan performance of the overall antenna is highly optimised for Europe, so that there is very little scan loss within Europe, and rapid fall-off of performance outside, as required for grating lobe suppression.

The invention has a number of high level variants in terms of partitioning between digital and analogue technology. The first variant assumes the use of analogue technology for the sub-array beam-forming and digital technology for the main beam-forming. The architecture is relevant to both receive (FIG. 2) and transmit cases (FIG. 3).

Figure 2:
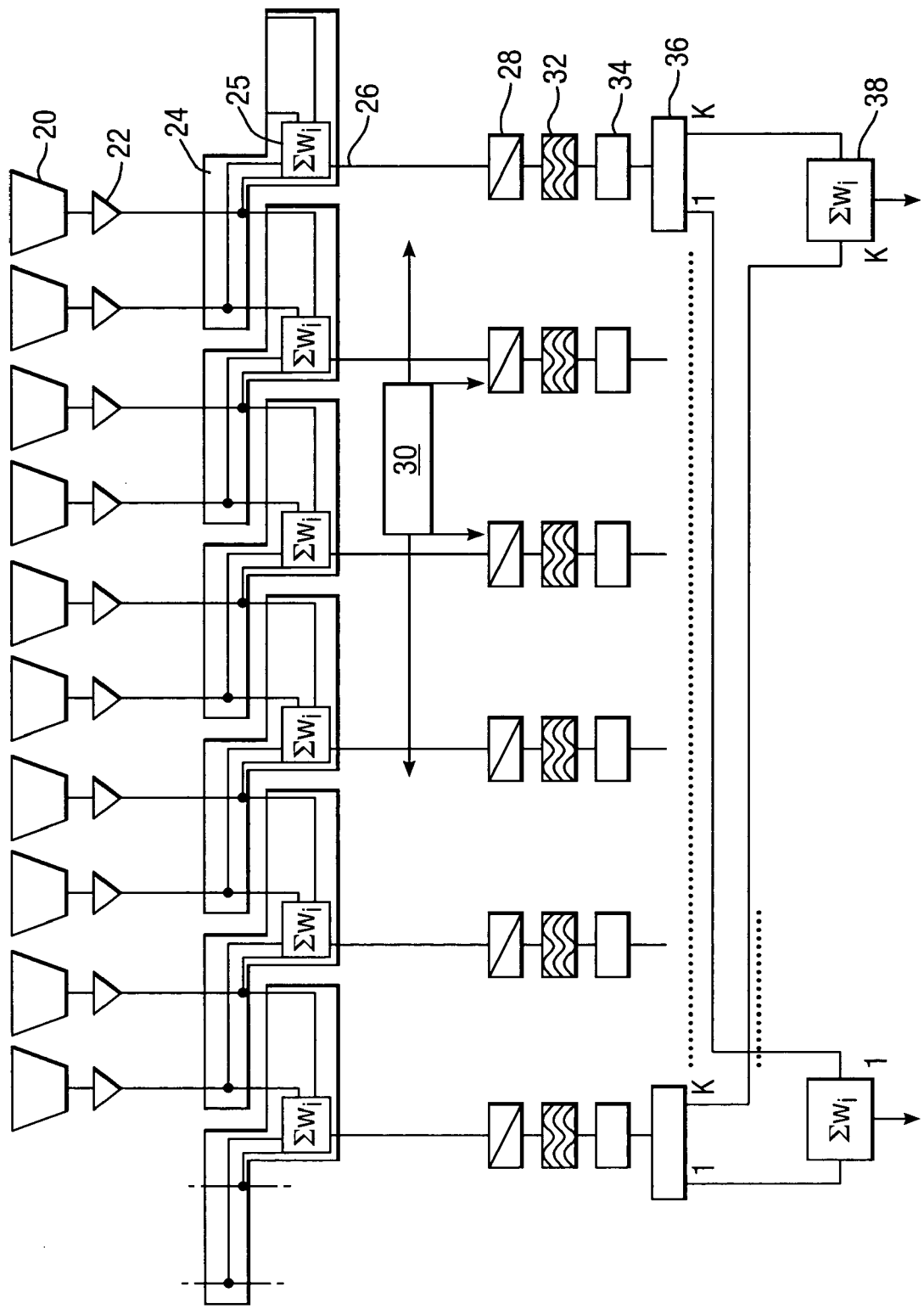
FIG. 2 is a schematic block diagram of beam-forming networks, coupled to a phased array antenna, in a receive mode of operation, and which is divided into overlapping sub-arrays, according to a first preferred embodiment of the invention.
Figure 3:
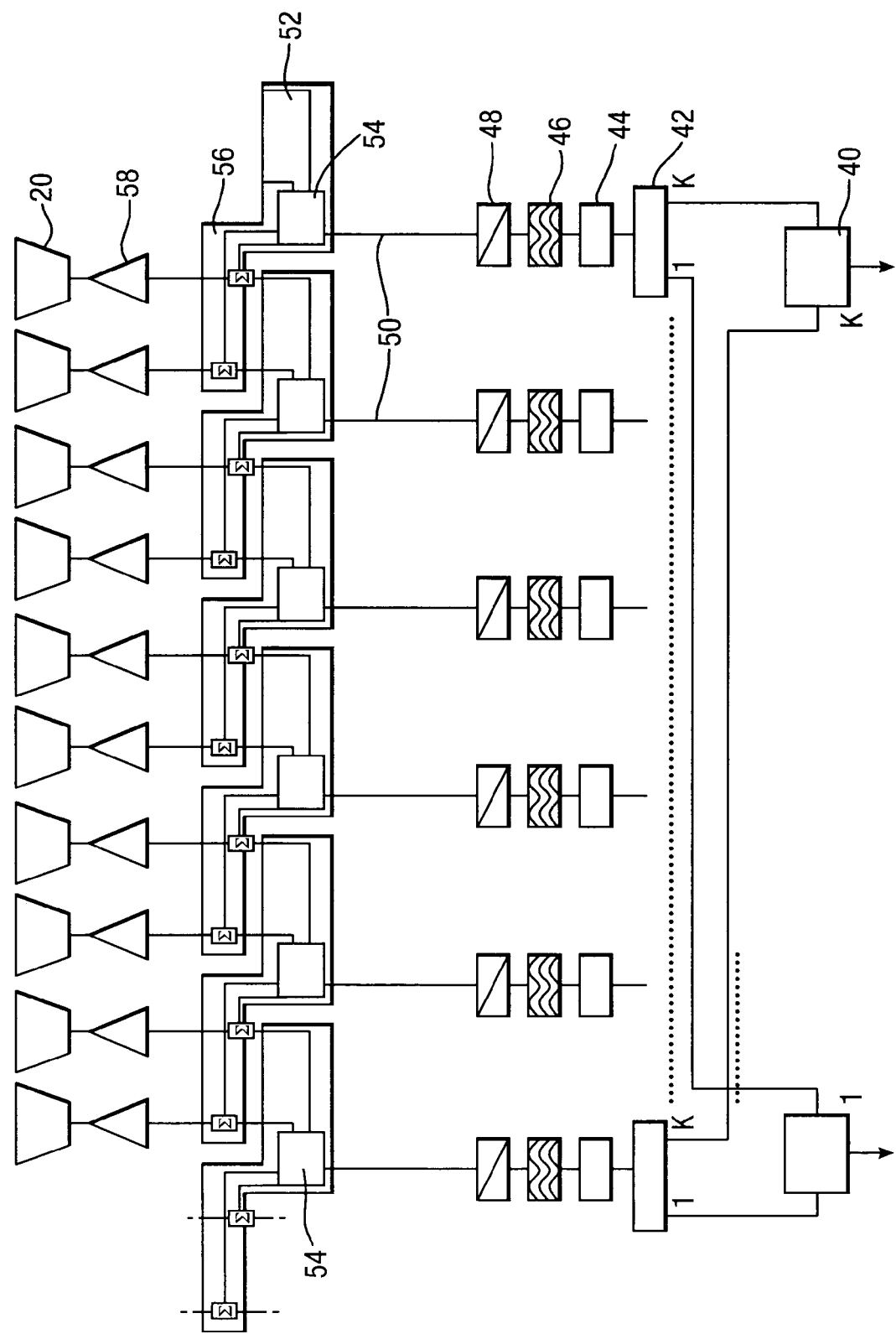
FIG. 3 is a schematic block diagram of beam-forming networks, coupled to a phased array antenna, in a transmit mode of operation, and which is divided into overlapping sub-arrays, according to the first preferred embodiment of the invention.

Referring now to FIG. 2, the first embodiment of the invention comprises a phased array antenna configured in receive mode, and comprising a Direct Radiating Array (DRA) with aperture formed by a 2 dimensional array of NE antenna elements 20 (only 1 dimension being shown in FIG. 2). The array is typically but not necessarily planar. Conformal arrays (i.e. arrays wherein the elements are placed on some non-planar surface, generally already present for another purpose), could equally well be used. The array comprises a regular geometry in terms of element centre locations (but not essentially), usually on a square, rectangular of hexagonal grid; the description herein assumes a square grid.

Each element provides a receive element signal to a respective Low Noise Amplifier (LNA) 22, with associated filtering to stop saturation of the amplifier when transmission takes place.

The elements provide inputs to a set of NS sub-array Beam-Forming Networks 24 (BFNs) which are implemented in analogue technology (typically for RF (GHz) but alternatively for a low IF where down conversion takes place at an early stage, in which case the components of the networks 24 may be of a lower specification. Each sub-array 24 comprises as shown, in this specific example, four adjacent geometrically similar elements, with each sub-array overlapping an adjacent sub-array in two elements. Each element therefore participates in two sub-arrays in the linear direction shown, so that the spacing between sub-arrays is 2 times that of the element spacing. There is a similar arrangement of sub-arrays in a second direction, so that over the area of the array, the number of sub-arrays NS is less by a factor of 4 than the number of elements NE. The sub-arrays may however be of any size if desired, and the elements of each sub-array may not be adjacent each other, but may be distributed over the antenna face.

Each sub-array beam-forming network 25 comprises a respective amplitude weighting device and phase weighting device coupled to each element input, followed by a summation device to sum weighted element contributions to provide the overall sub-array output at output port 26. Typically, but not necessarily, the same weight set may be applied to each sub-array. The radiation pattern formed by the sub-array provides an envelope to the patterns that may be formed by the overall DRA system, so that the sub-array pattern covers a region within which it is required to form a grid of spot beams and may, in addition, limit the gain outside this region in order to limit interference. In one variation the weights within the sub-array may be constant over time. In a second variation they may be controllable in which case it becomes possible to implement a gross reconfiguration of the coverage envelope whilst in orbit. The precise values of the complex sub-array weights are determined an optimisation process, as more particularly described below.

Each sub-array output, or control point 26, is connected to a down converter 28 to reduce the RF signal to an IF frequency. The down conversion requires a common local oscillator frequency source 30 to maintain phase tracking between the sub-array signals. Band filters 32 limit the sub-array signals to the overall frequency band of interest, and each sub-array signal is converted, by an ND converter 34, to a sequence of digital samples.

The down conversion typically places the band of interest close to zero frequency (having regard to the bandwidth of the signal and the sample rate of ADC 34) for each of the sub-arrays. The sample rate of the A/D converters is at least twice the bandwidth of the band of interest and may involve real sampling (single ND per sub-array) or complex sampling (pair of ND per sub-array operating in quadrature. Complex sampling requires converting the input signal to IQ format prior to ND conversion, and this may occur in known manner at the down conversion stage 28, where local oscillator signals are provided in phase quadrature.

The overall band of interest contains K narrowband channels which are contained within a series of spot beams formed within the overall coverage region as defined by the sub-array pattern. Each digitised sub-array signal is digitally frequency demultiplexed into the K separate channels in a demultiplexer 36. Advantageously, each channel signal will typically involve decimation in the demultiplexer of the complex sample rate consistent with the channel bandwidth, for simplification of subsequent processing.

There is a digital beam-forming network (BFN) 38 associated with each of the K channels, which is connected to respective outputs of each demultiplexer 36, so as to gather all the components of the respective channel. Each digital BFN multiplies the sampled input from each of the sub-arrays by a complex coefficient (equivalent to amplitude and phase control in analogue terms) and sums the weighted outputs to form an overall channel output signal. Selection of the complex weights for a given channel determines the beam properties for that channel. For example, in order to form a spot beam in a given direction, given that the sub-array weights are already determined, the weights are selected, by a process that will be readily apparent to the person skilled in the art, such that there is a uniform phase gradient across the set of overlapped sub-arrays such that the sub-array patterns add coherently in the required direction. Thus selection of DBFN weights can be used to steer capacity between available spot beam directions in response to a changing traffic pattern or to exercise a more general control in beam properties (size and shape). In a further variation a given frequency channel may be reused by multiple spot beams, in which case there are multiple DBFNs for a given channel each forming a separate beam for which there is sufficient spacing in order to limit mutual interference.

A key feature of the invention is that the use of the overlapped sub-arrays serves to simplify the digital processing within the overall architecture when compared to a phased array system whereby each of the Ne primary elements is digitally sampled and processed. Specifically the number of down converters, band filters, ND converters and frequency demultiplexers is reduced from Ne to Ns (i.e. by a factor of 4 in this example) and further the dimension of the digital BFNs is similarly reduced from Ne to Ns. This simplification translates into reduction of mass and power within a practical implementation which can make the difference between feasibility or non-feasibility for a spacecraft, given the status of relevant digital enabling technologies.

For the specific example described below of European spot beam, the number of control points is a factor of approximately 20 lower than the number of elements (4000). This implies a dramatic reduction in digital processing complexity, which can make such a system feasible.

Referring now to FIG. 3, which is an equivalent architecture to FIG. 2, but for a transmit mode, each of K communication narrow band channels is fed to a respective digital beam-forming network (DBFN) 40, where complex weighting is applied to define the spot beams. The weighted channels are multiplexed in a series of Ns K-way digital frequency multiplexers 42. The output of each multiplexer is coupled to a respective D/A converter 44, and the analog output is fed to a band filter 46 and an up converter 48, for converting the multiplexed signal to an RF frequency. The RF signal is applied to an input port 50 of a sub-array 52. Each sub-array has a beam-forming network 54, where the signal is divided by a splitter into individual antenna element signals, four in this case, each signal being subject to respective amplitude and phase weighting. The weighted element signals are combined in a summing device 56 with corresponding element signals from other sub-arrays 52, and fed via a high power amplifier (HPA) 58, to a radiating element 20.

The functions of DBFNs 40 and sub-array beam-forming networks 52 are the same as in the receive case of FIG. 2, and will not be further described.

Further variations exist in terms of other digital processing architectures. An example relates to an efficient approach to digital beam-forming whereby an FFT (Fast Fourier Transform) is used to form a regular grid of spot beams. Digitised sub-array outputs form inputs to the FFT whilst the outputs from the FFT represent a regular grid of spot beams. Again the overlapped sub-array approach provides simplification in terms of the numbers of A/Ds and the dimension of the FFT.

Figure 4:
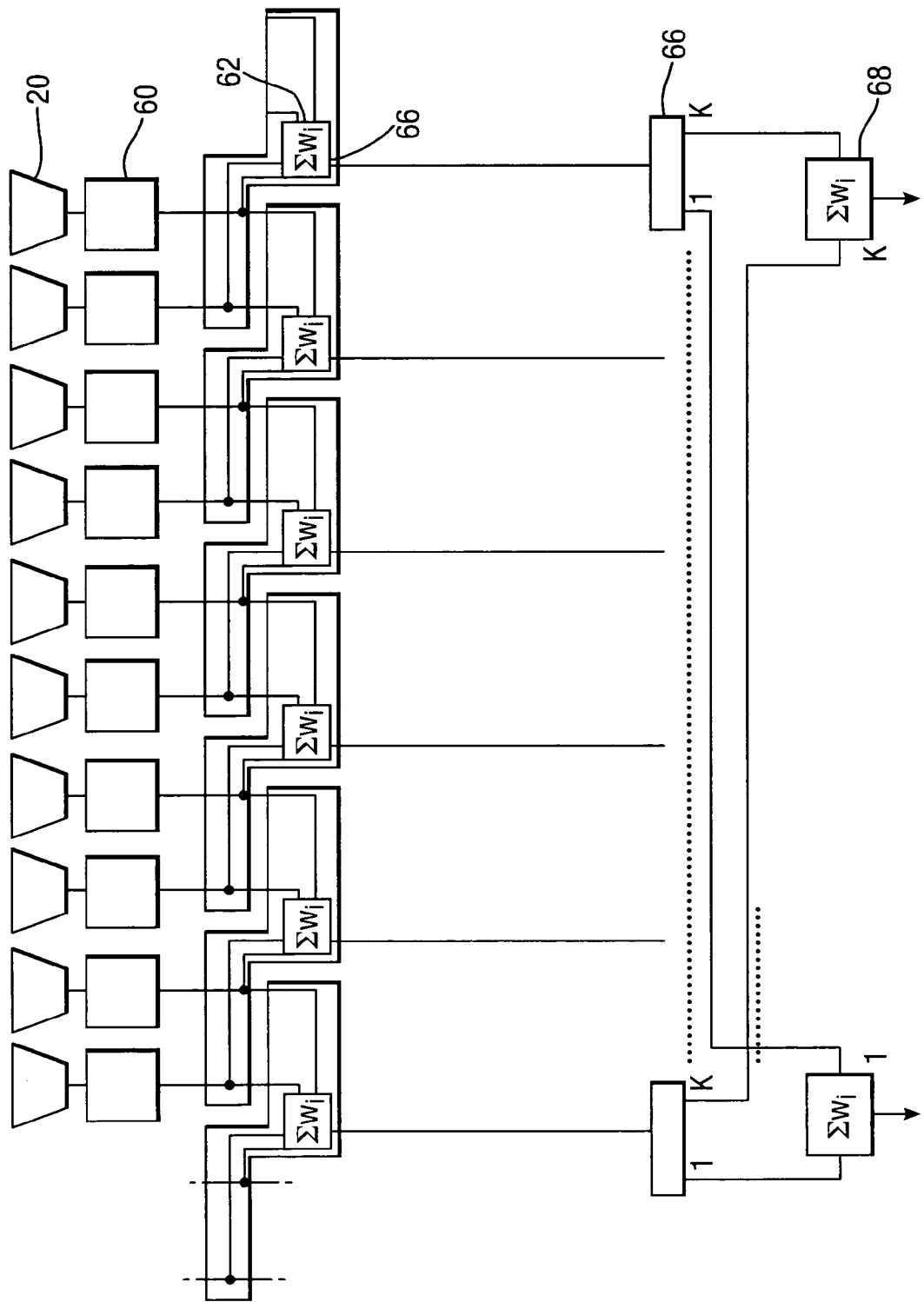
FIG. 4 is a schematic block-diagram of beam-forming networks, coupled to a phased array antenna divided into overlapping sub-arrays, according to a second preferred embodiment of the invention.

In a second major embodiment (implementation variant), as shown in FIG. 4, the sub-array beam-forming and main beam-forming are both implemented using digital technology. In FIG. 4, similar parts to those in FIG. 2 are denoted by the same reference numeral. In FIG. 4, each element 20 is coupled to a block 60, which comprises a low noise amplifier, down converter, band pass filter, ADC—i.e. block 40 replaces elements 22, 28-34 of FIG. 2. Thus, each of the Ne elements 20 has an analogue receive function comprising an LNA, overall band filtering and down conversion. Each digital element signal is digitally sampled in an ND converter, in the same way as FIG. 2.

The overlapping sub-array scheme is the same as that of FIG. 2, with four elements forming a sub-array in the linear direction shown. A digital beam-forming network 62 is provided for each sub-array; beam-forming is implemented digitally with a series of complex weights and digital summation. As with the analogue weights of FIG. 2, the weights may be fixed or variable but this approach lends itself well to a variable weight implementation. The sub-array outputs are frequency demultiplexed at 66 and beam-formed into an array of spot beams with digital beam-forming networks 68.

The advantages of this approach, when compared with a digitally implemented system without sub-arrays, are less obvious. The number of A/D converters and associated receive chains is increased to Ne but there remains advantages in terms of reduction of number of frequency demultiplexers (which have a high processing load) and the dimension of the main digital BFNs.

Figure 5:
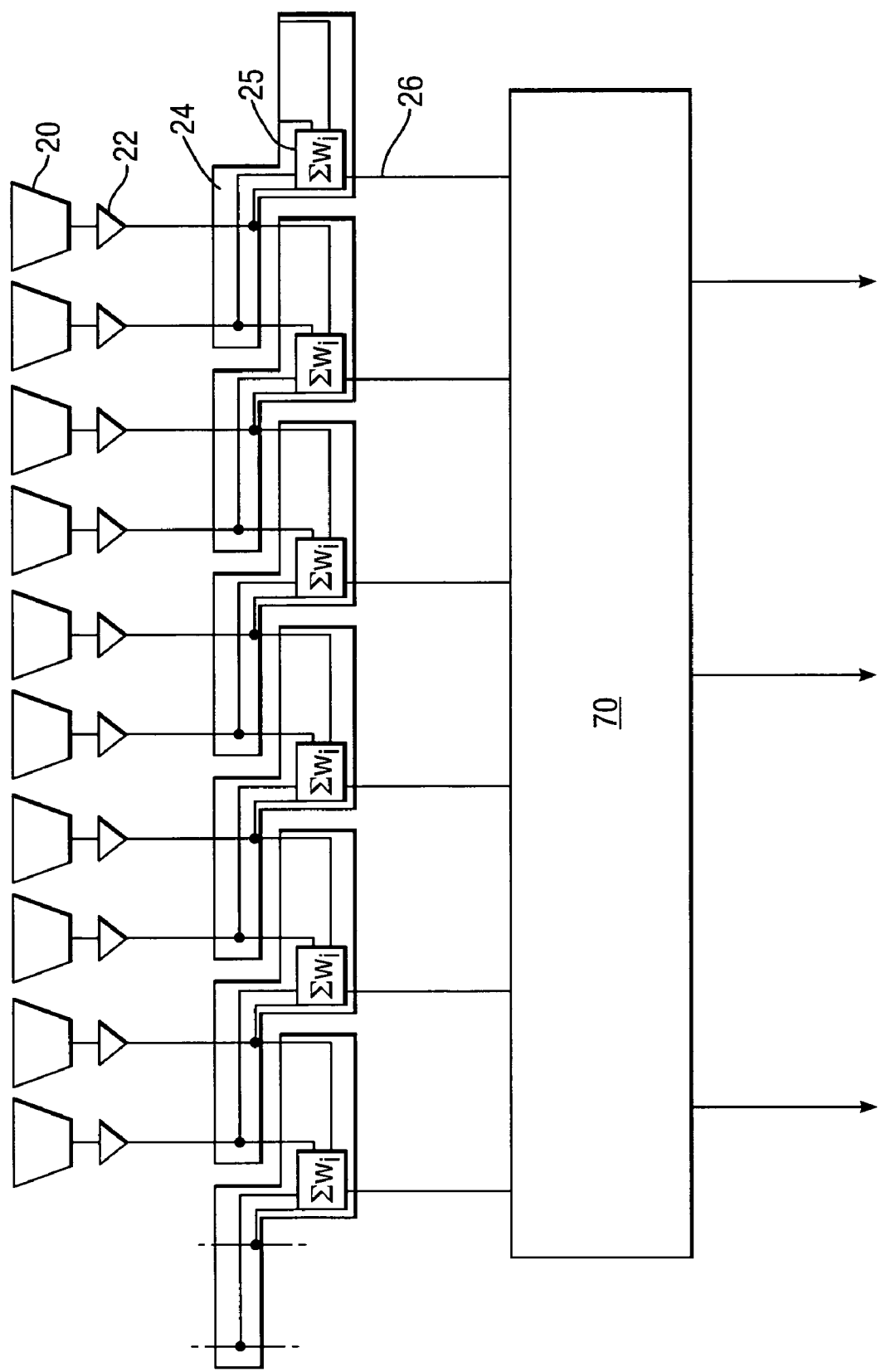
FIG. 5 is a schematic block diagram of beam-forming networks, coupled to a phased array antenna divided into overlapping sub-arrays, according to a third preferred embodiment of the invention.

In a third major embodiment (implementation variant), as shown in FIG. 5, the sub-array beam-forming and main beam-forming are both implemented using analogue technology. In FIG. 5, similar parts to those in FIG. 2 are denoted by the same reference numeral. In FIG. 5, the sub-arrays 24 have a set of sub-array analogue beam-forming networks, as in FIG. 2. The outputs 26 of the sub-array BFN form inputs to an analogue BFN arrangement 70, the details of which will not be described, since they will be apparent to the person skilled in the art. The advantage of the approach lies in the reduction of the dimension of the analogue BFN 70, as compared with a wholly analogue implementation without sub-arrays.

Figure 6:
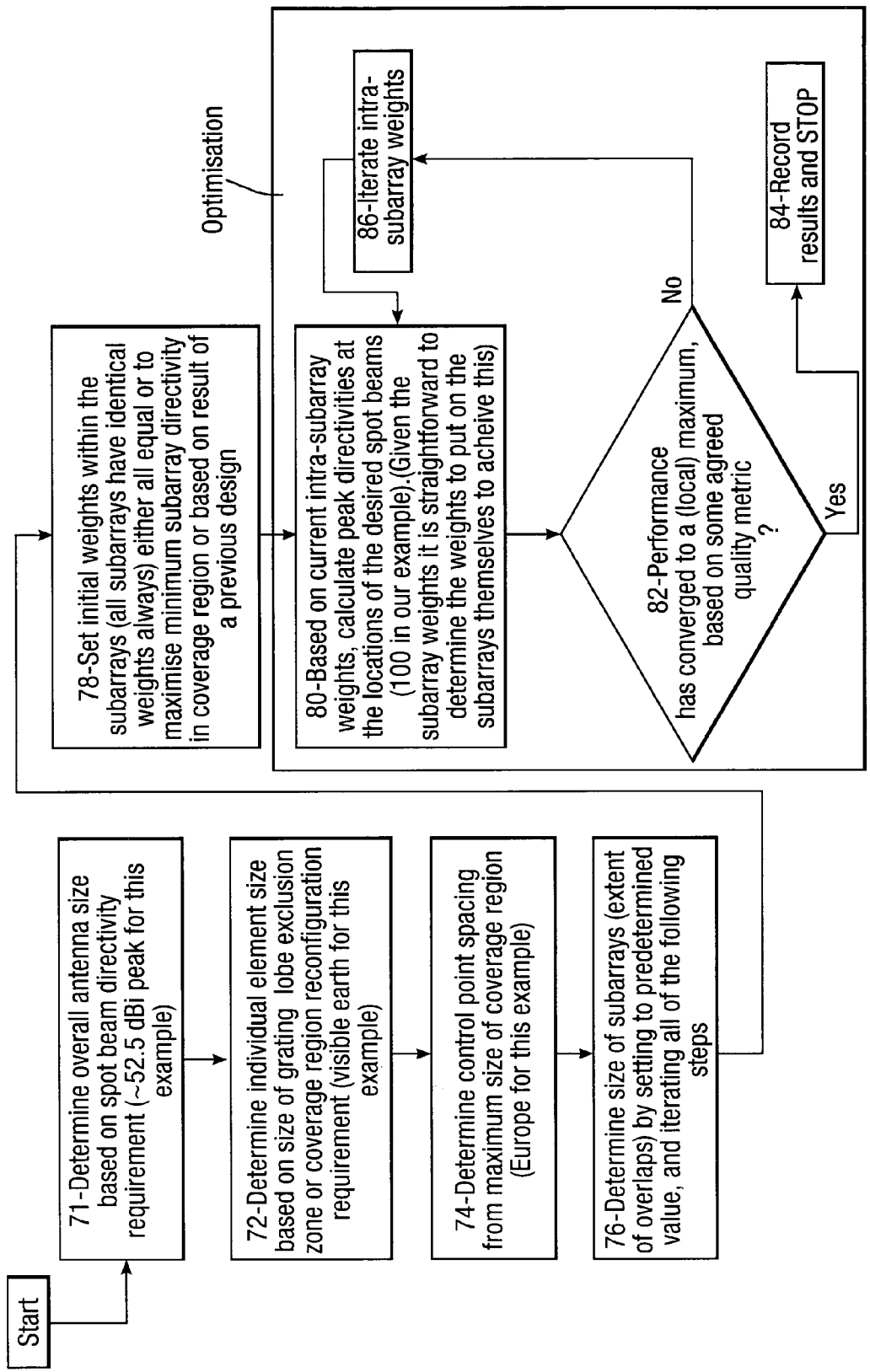
FIG. 6 is a flow chart showing significant steps in the optimisation process of the beam-forming weights of the invention.

Referring to FIG. 6, this shows a flow chart of an optimization process for determining the characteristics of the sub-array and main beam-forming weights, as follows:

Step 1 (71): Determine overall antenna size based on spot beam directivity requirement (−52.5 dBi peak for this example)

Step 2 (72): Determine individual element size based on size of grating lobe exclusion zone or global area reconfiguration requirement (visible earth for this example)

Step 3 (74): Determine control point (port) spacing of sub-arrays from maximum size of geographical region to be covered (Europe in this example)

Step 4 (76): Determine size of sub-arrays (extent of overlaps) by setting to an initial predetermined value, and subsequently if necessary, by iteration, including the following steps 5 to 7.

Step 5 (78): Set initial weights within the sub-arrays either all equal or to maximise minimum sub-array directivity in coverage region. In this example, all sub-arrays have identical weights, but this is not necessary, and performance improvements may be attainable with non-identical sub-arrays.

Step 6 (80): Based on current intra-sub-array weights (the weights within the sub-arrays), calculate peak directivities at the locations of the desired spot beams (100 in this example). Given the intra sub-array weights it is straightforward to determine the external weights to put on the sub-array control points to achieve this, as follows. With only a little loss of performance, the sub-array centres are regarded as separate elements, with equal amplitude applied to the sub-arrays and a phase determined from the sub-array centre location and the desired beam pointing direction. To apply a fully rigorous determination, further matrix manipulations will be required, that will be readily apparent to the person skilled in the art.

Step 7 (82): Performance has converged to a (local) maximum, based on some agreed quality metric?

If YES, Record results and STOP (84)

If NO, Iterate intra-sub-array weights (86). If NO for all intra sub-array weights, iterate size (step 4) and if necessary spacing (step 3) of sub-arrays.

Example

Figure 8:
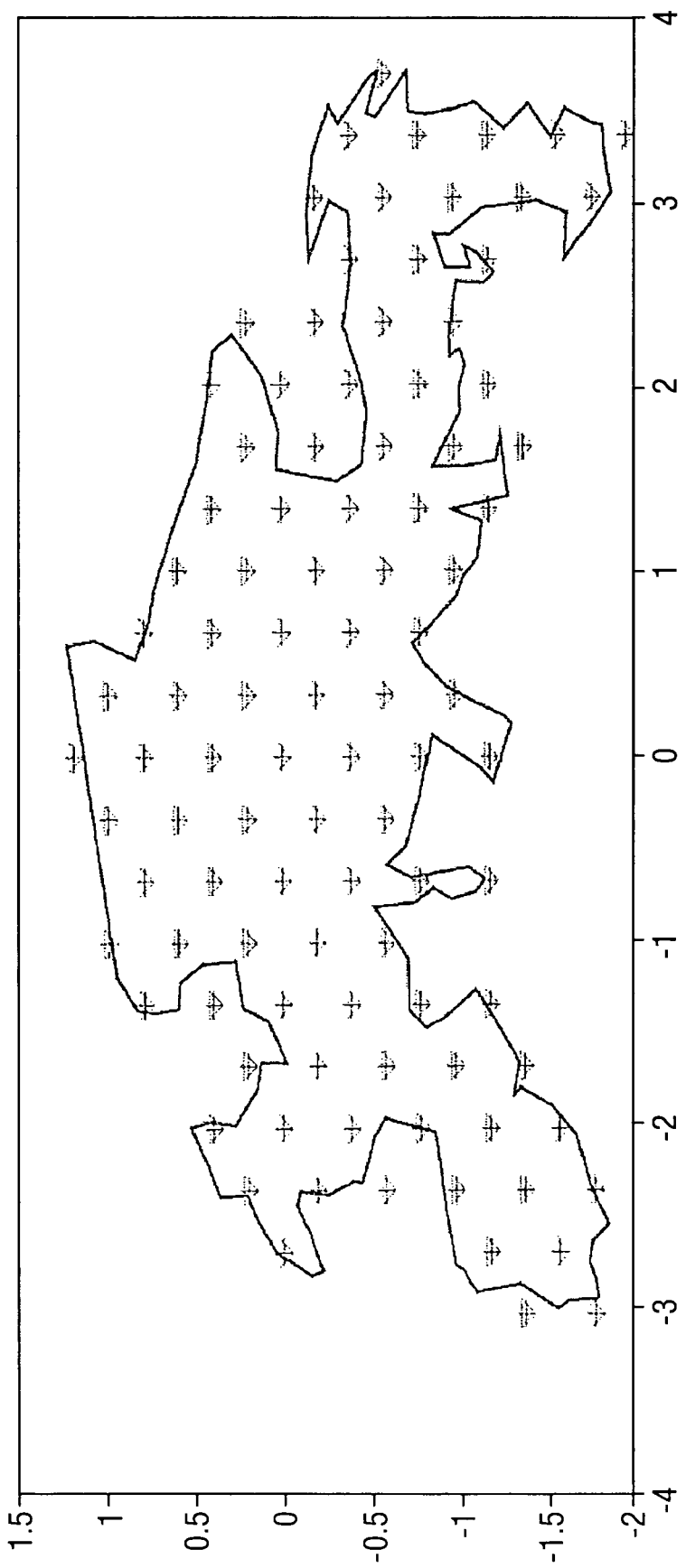
FIG. 8 is a diagram showing a predefined geographical region of the globe, Europe, with 100 spot beams covering the region.

Referring to FIG. 8, this shows a desired arrangement for European coverage, of 100 spot beams, Boresight pointed to 17° E, 48.5° N, from geostationary location at 7° E For the initial design considerations of the antenna:

Begin with a DRA aperture of 2.4 m (comparable to the size of an AFR reflector), element spacing 2.12 wavelengths. Element spacing determines how much performance the antenna loses when it is scanned. That is, the drop-off in performance of each individual element between the centre and the edge of the earth results in an irrecoverable performance loss. On the other hand, the smaller the elements, the more of them are required, so, there is a trade off which usually for geostationary satellites results in an element size in the range 2-3 wavelengths.

Coverage has extent 6.75° E/W, 3.12° N/S

Element 2.12 wavelength, decimation into overlapping sub-arrays by 3 E/W and 6 N/S on a square element lattice is attempted.

Figure 7:
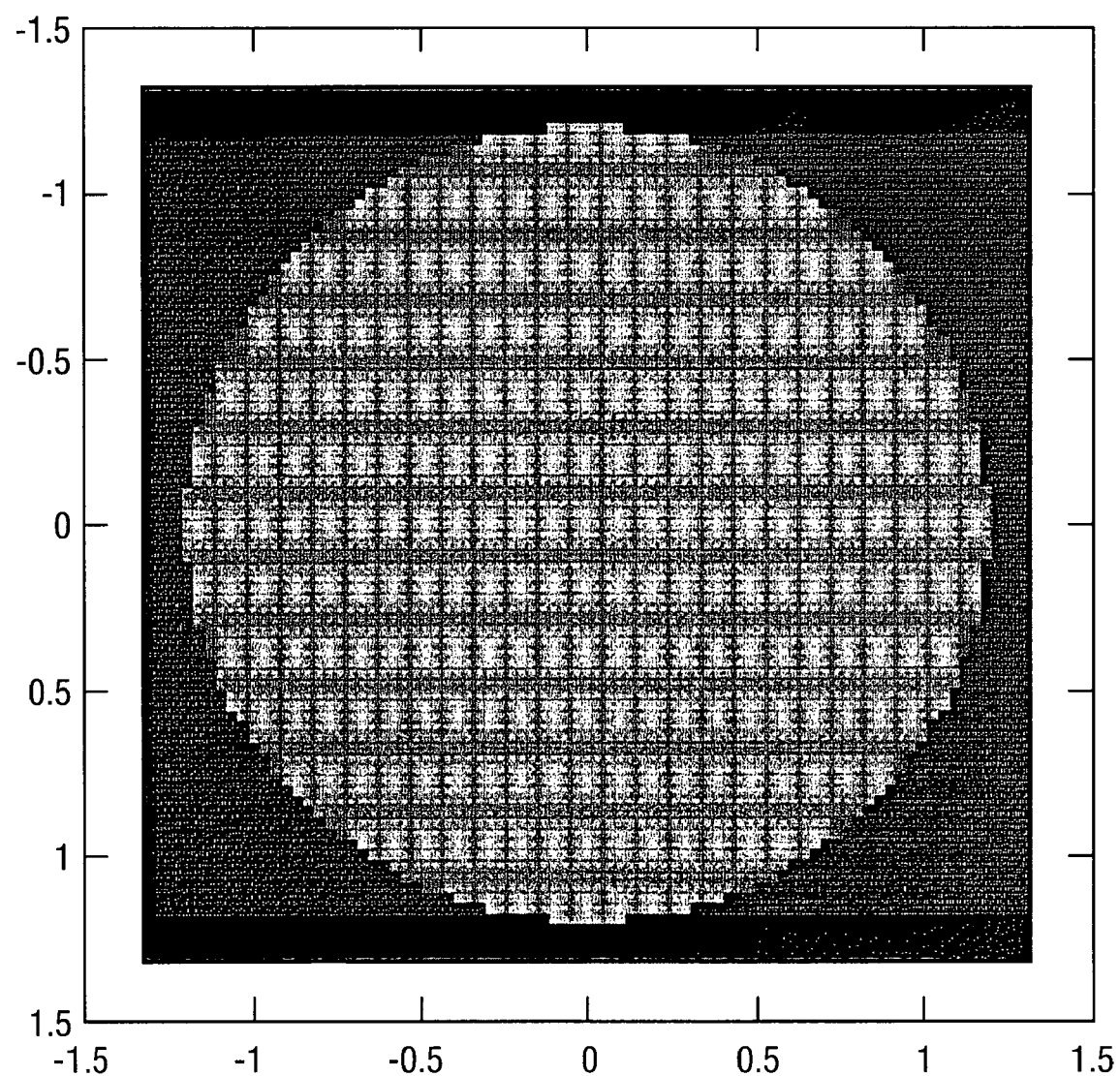
FIG. 7 is a diagram of the face of an Example of a phased array antenna showing the division of the antenna elements into overlapping sub-arrays.

This results in an array containing 4349 elements and 249 control points as shown in FIG. 7. Light peaks show control points, fine structure shows individual elements As regards the selection of sub-arrays, to compromise between degree of overlap and analogue RF complexity of sub-arrays, sub-arrays chosen to occupy 2×2 control point rectangles. Each element participates in 4 sub-arrays, except at array edges. Each sub-array contains 12×6=72 elements.

Referring to FIG. 7, a planar phased array of approximately circular outline is shown, diameter 2.4 m, comprising approximately 4000 elements. Elements are grouped into overlapping sub-arrays of 72 elements, spaced six elements apart in one direction, three in the other. Sub-arrays may be implemented as interlocking tiles, and each element participates in four sub-arrays.

Elements in a sub-array have weights optimised initially to maximise the minimum spot beam peak directivity achievable at the locations of the 100 beam centres by the process described above with reference to FIG. 6.

Partially populated sub-arrays are simply truncated; weights on the populated elements are the same as those on the complete sub-arrays.

Optimisation may also be carried out to suppress directivity in potential grating lobe directions.

The results show that when a sub-array comprises 2×2 control point cells, the minimum directivity in any of the 100 directions is 52.60 dBi, after amplitude and phase optimisation on the sub-array elements.

2.12 wavelength elements (according to this simple model) has peak directivity 16.7 dBi, with ~0.3 dB roll off at 4°

Hence best possible minimum, with all 4349 elements is ~52.8 dBi

When a sub-array comprises 1×1 cells (i.e. they do not overlap) the best achievable seems to be 50.4 dBi from the 249 control points.

Figure 9:
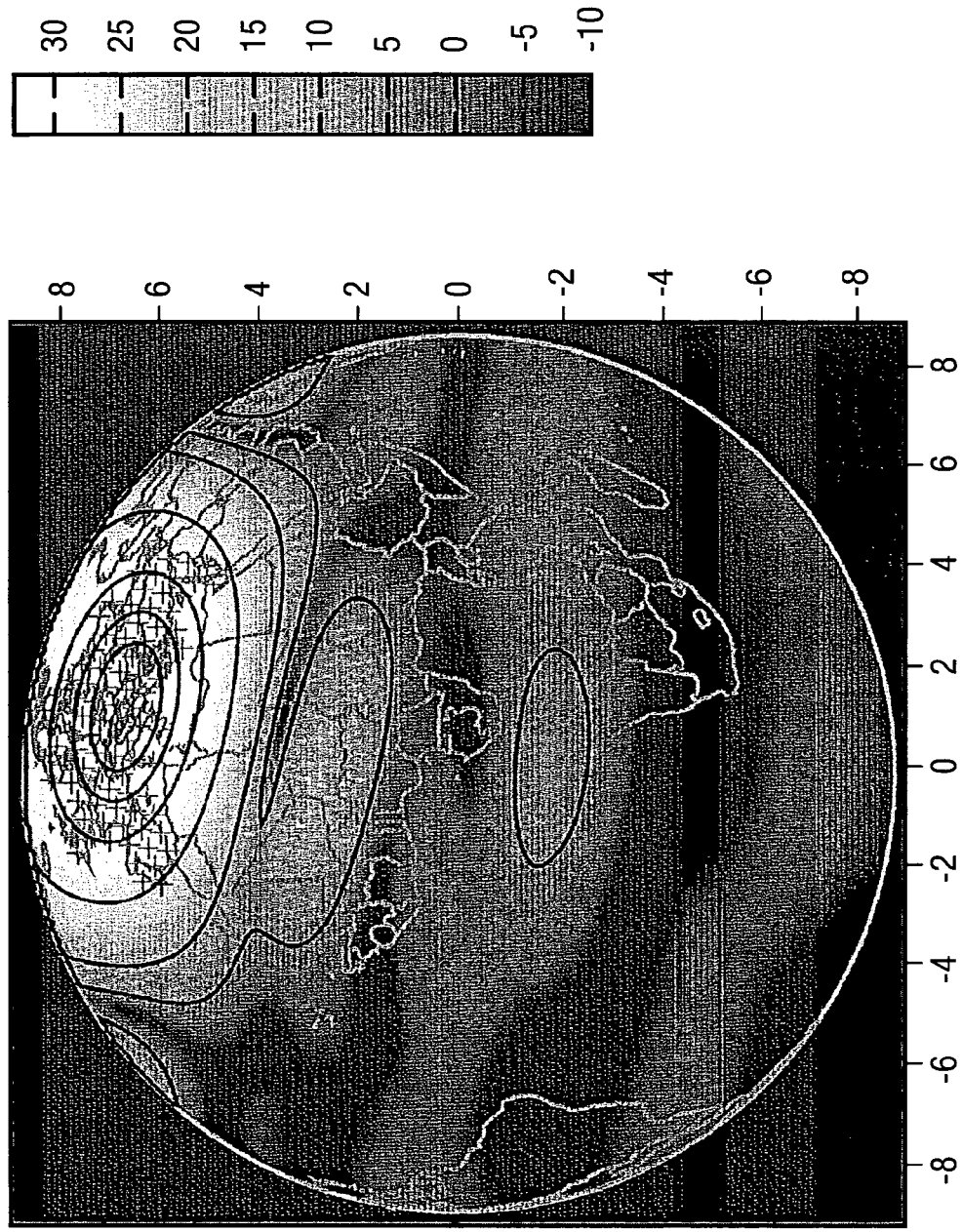
FIG. 9 is a diagram showing the coverage of the European region in terms of directivity, produced by an Example of a single sub-array of the invention.
Figure 10:
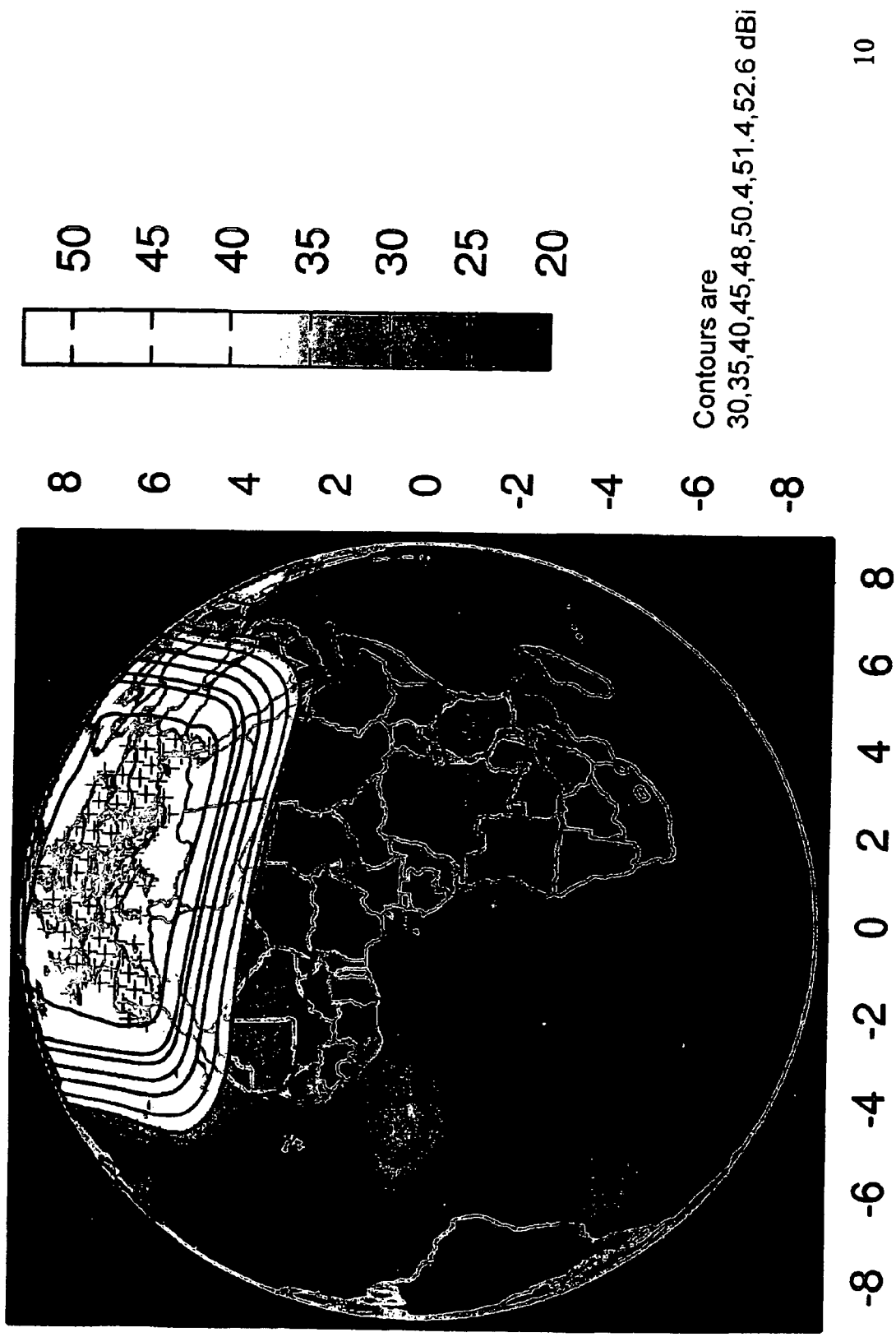
FIG. 10 is a diagram showing the coverage of the European region in terms of directivity, produced by the superposition of all the sub-arrays of the phased array antenna of an Example of the invention.
Figure 11:
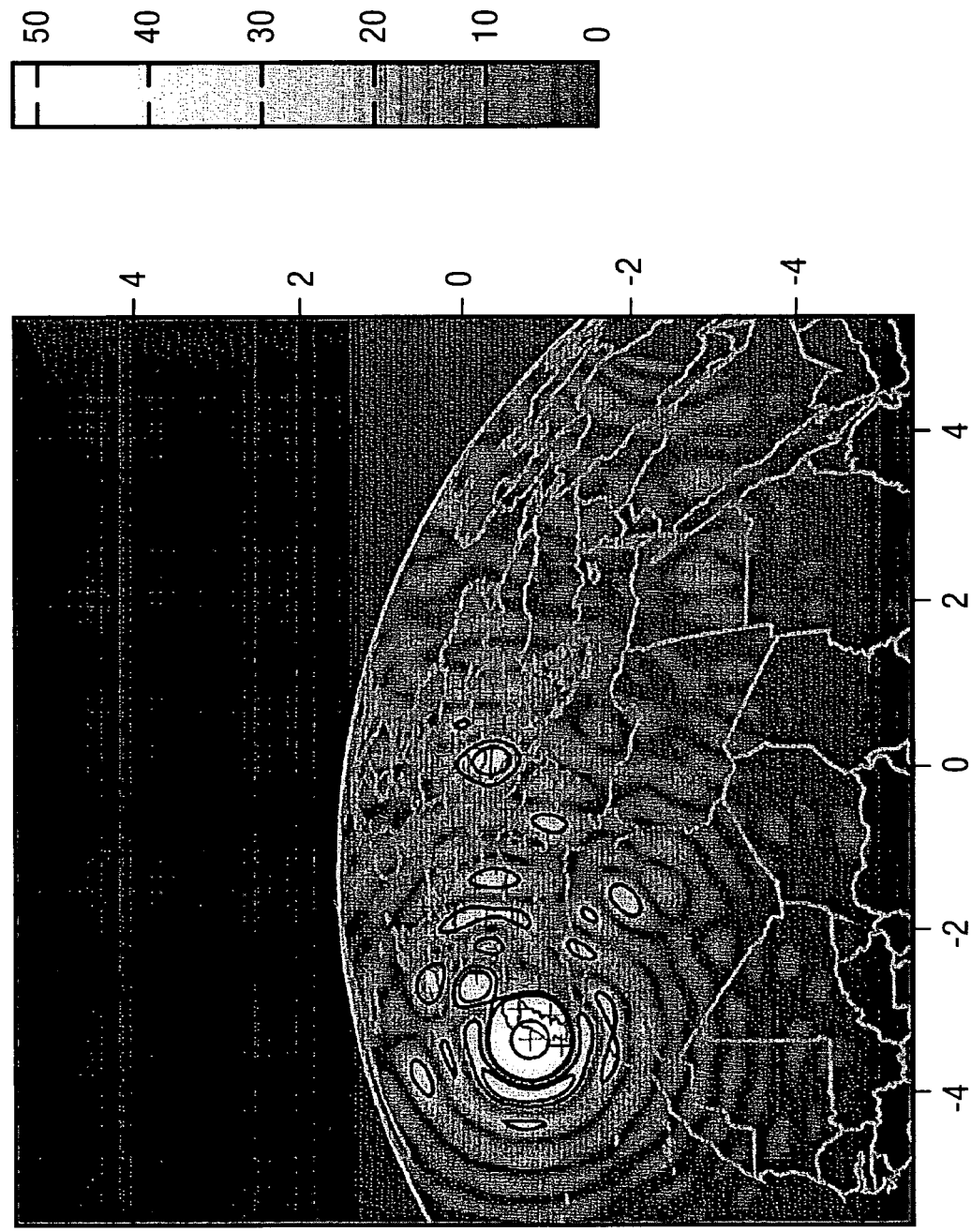
FIGS. 11 and 12 are diagrams showing spot beams produced by an Example of the invention, in terms of directivity.

FIG. 9 shows plots of spot beam peak vs. direction for a single sub-array. FIG. 9 shows that the beam of the sub-array is centred on the European region. Other sub-arrays will provide beams of similar amplitude. FIG. 10 shows the composite sub-array pattern, and it will be noted there is a very high directivity value within the European region, which very rapidly falls off outside the region. The relative phasing between the sub-arrays generates the spot beams. Two specific spot-beams are shown in FIGS. 11 and 12.

For subsequent spot-beam optimisation, retaining the internal sub-array weights optimised above, the weights on the 249 sub-arrays were optimised for the 100 beams in turn:

Against a target combining edge-of-beam directivity and side lobe levels. For these 100 0.45° beams, optimised peak directivities are typically 52 dBi, about 0.5 dB below maximum possible directivity, presumably because the beams are slightly larger than the minimum possible from this aperture, and the side lobe optimisation requires a certain edge taper.

Figure 12:
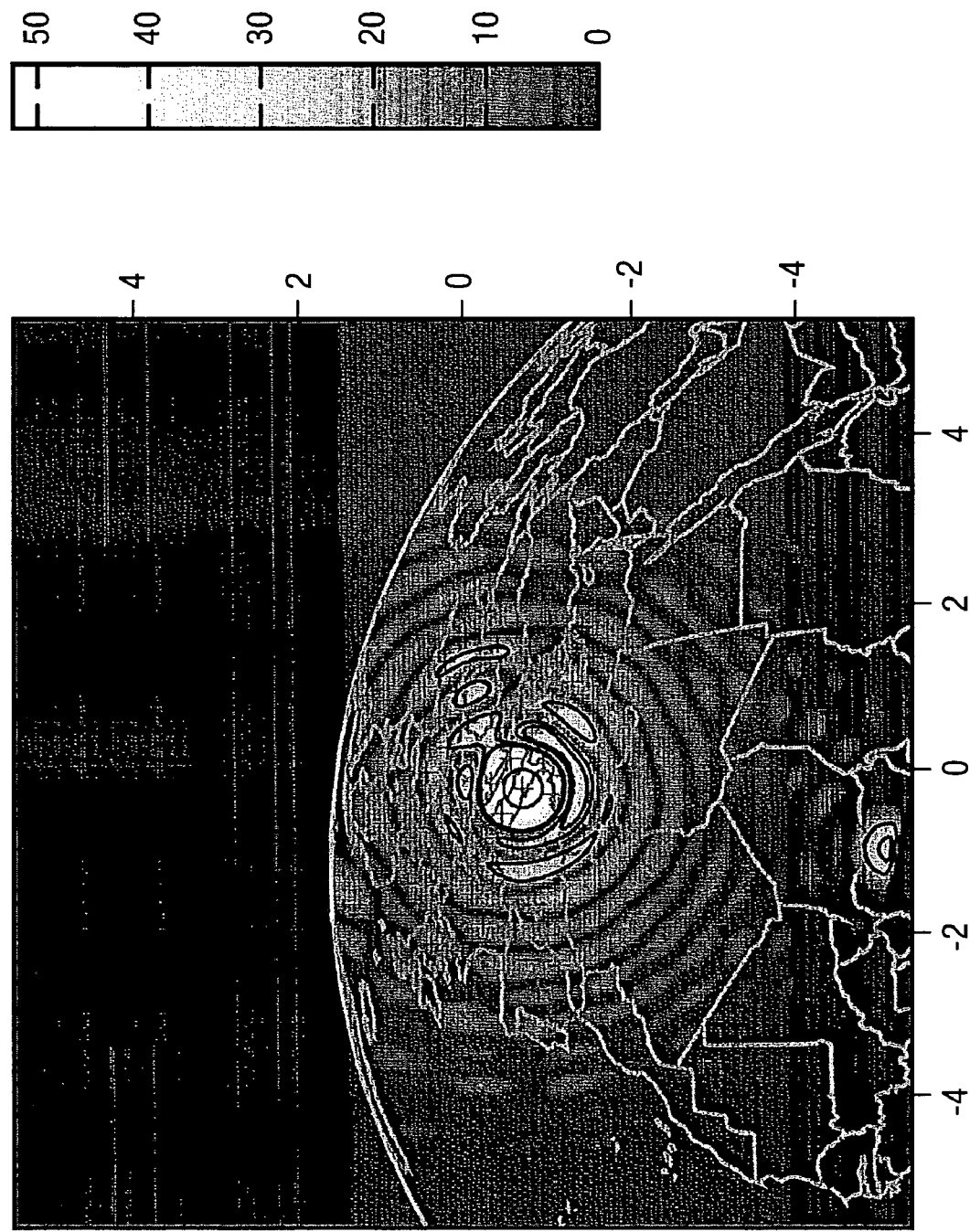
Figure 13:
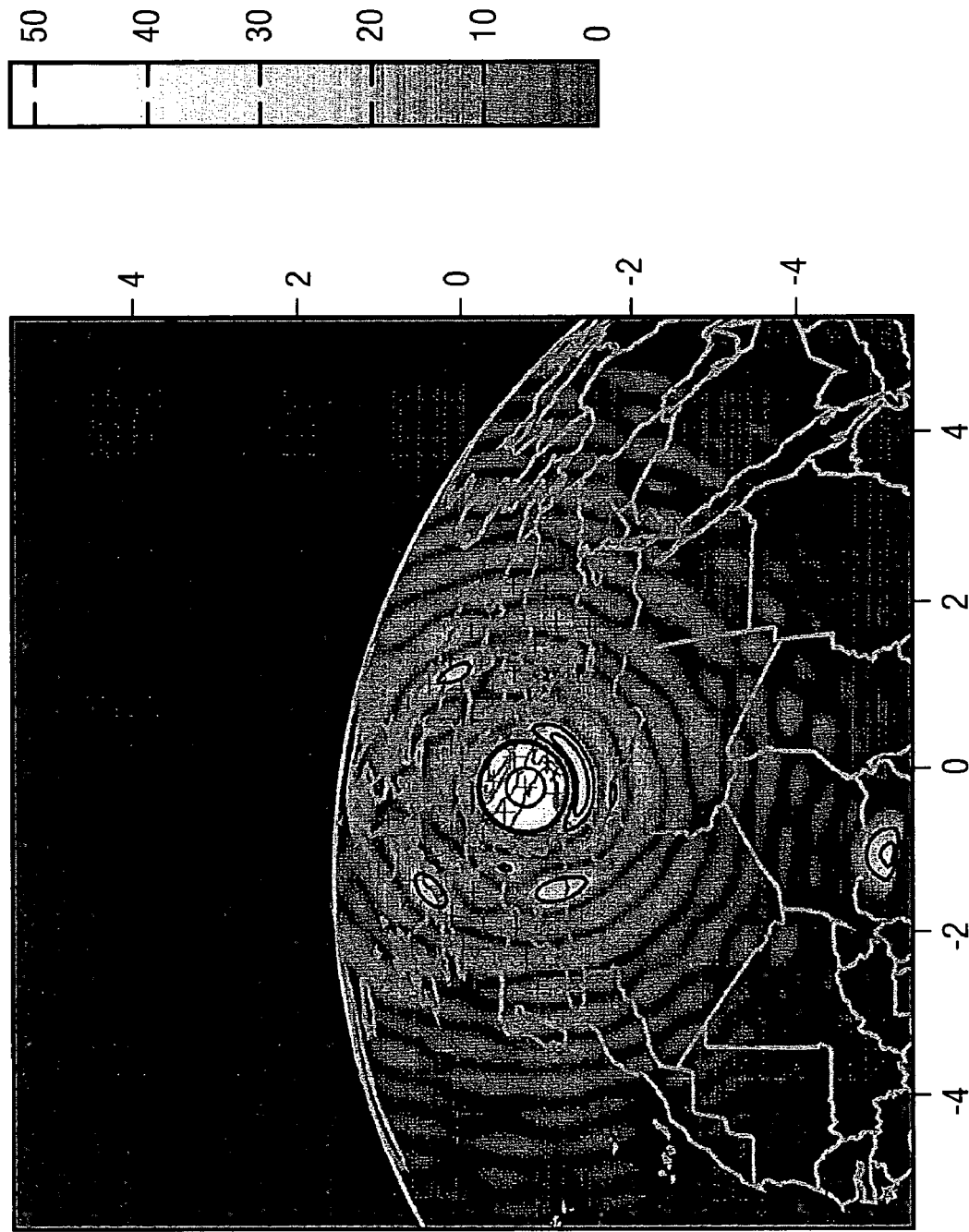
FIG. 13 is a diagram of a reoptimised spot beam of FIG. 12.

FIG. 13 shows the result of reoptimisation for the spot beam of FIG. 12.

The invention claimed is:

1. A method of beam-forming for an antenna of a telecommunications spacecraft, the antenna comprising a phased array antenna, and the antenna providing a plurality of communications beams within a predefined geographical region, the method comprising:

providing the phased array antenna as a plurality of antenna elements, each antenna element having an antenna element signal having a phase relationship and an amplitude relationship to the other element signals, and partitioning said antenna elements into a plurality of overlapping sub-arrays, each sub-array comprising a subset of all the antenna elements of the phased array, and at least some or all the antenna elements participating in more than one sub-array, allocating to elements of each sub-array respective intra sub-array beam-forming weights, and allocating to each sub-array respective main beam-forming weights for said plurality of communications beams such that the composite radiation pattern of the antenna provides said plurality of communications beams within said region, wherein a desired antenna directivity value for the plurality of communications beams is determined by an optimisation process, involving changing, in iterations, of said intra sub-array beam-forming weights, together with determination of main beam-forming weights for said beams at each said iteration.

2. A method according to claim 1, wherein said antenna is dimensioned to provide coverage over a global area, and said region comprises a limited part of said global area.

3. A method according to claim 2, wherein said region comprises two or more geographically separate areas.

4. A method according to claim 2, wherein said spacecraft is a geostationary satellite.

5. A method according to claim 1, wherein said beams are spot beams, each having at least a predetermined antenna directivity value.

6. A method according to claim 1, wherein said main beam-forming weights are further optimised against a target combining edge-of-beam directivity and side lobe levels.

7. A method according to claim 1, wherein a set of weights is allocated to each sub-array, which is the same as sets assigned to the other sub-arrays.

8. A method according to claim 1, wherein said intra sub-array beam-forming weights are in analog form, and said main beam-forming weights are in digital form.

9. A phased array antenna, the antenna providing coverage over a predefined geographical region and providing a plurality of beams within said region, and comprising:

a plurality of antenna elements, each antenna element having an antenna element signal having a phase relationship and an amplitude relationship to the other element signals, and said antenna elements being partitioned into a plurality of overlapping sub-arrays, each sub-array comprising a subset of all the antenna elements of the phased array, and at least some of the antenna elements participating in more than one sub-array, a sub-array beam-forming network which allocates to elements of each sub-array respective intra sub-array beam-forming weights, and a main beam-forming network which allocates to each sub-array main beam-forming weights for each of said plurality of beams such as to produce said plurality of beams within said region wherein intra sub-array beam-forming weights allocated to each sub-array have been optimised in order to attain a desired level of said directivity for said plurality of beams by an optimisation process wherein said intra sub-array beam-forming weights are changed in value in iterations, and at each iteration main beam-forming weight values allocated to said sub-arrays are determined.

10. A phased array antenna according to claim 9, wherein at least some of said beams has a said desired value of directivity, which is at least a predetermined value.

11. A phased array antenna according to claim 9, wherein each said sub-array has an essentially similar set of intra sub-array beam-forming weights allocated to the other sub-arrays.

12. A phased array antenna according to claim 9, wherein said sub-arrays have essentially a similar geometric configuration.

13. A phased array antenna according to claim 9, wherein said beams are communication beams and the phased array antenna is for a telecommunications spacecraft.

14. A phased array antenna according to claim 9, wherein said antenna is dimensioned to provide coverage over a global area, and said region comprise a limited part, or more than one part, of said global area.

15. A phased array antenna according to claim 14, wherein said spacecraft is a geostationary satellite.

16. A phased array antenna according to claim 9, wherein the phase array antenna is formed in two dimensions and each sub-array extends in both dimensions.

17. A phased array antenna according to claim 9, wherein said sub-array beam-forming network assigns to each sub-array a set of weights, which is the same as sets assigned to the other sub-arrays.

18. A phased array antenna according to claim 9, wherein said sub-array beam-forming network includes a respective analog phase shifting means and a respective analog gain shifting means coupled to each antenna element.

19. A phased array antenna according to claim 9, wherein the phased array antenna has a receive function, and said sub-array beam-forming network includes, for each sub-array, a signal combining means for the element signals of the sub-array to provide a combined output signal to a sub-array output port.

20. A phased array antenna according to claim 9, wherein the phased array antenna has a receive function, and including down-converting means for down-converting sub-array output signals, or for down-converting individual element signals.

21. A phased array antenna according to claim 19, including analog to digital conversion means for digitising the output signals of each sub-array, frequency demultiplexing means for demultiplexing each sub-array output signal into a plurality (K) of channels signals, and a respective digital beam-forming network for each of said plurality (K) of channels, coupled to receive the respective channel signal from each sub-array output, and arranged to apply a complex weight to each said channel signal, and to sum the weighted channel signals, to provide a channel output signal.

22. A phased array antenna according to claim 21, including a plurality of digital beam-forming networks for one of said plurality (K) of channels, for providing a plurality of channel outputs for that channel for frequency reuse.

23. A phased array antenna according to claim 9, including analog to digital conversion means for digitising the output signals of each sub-array, and including FFT means coupled to receive the digitised signals and incorporating said main beam-forming network, and arranged to provide an output representing an array of spot beams.

24. A phased array antenna according to claim 9, wherein the sub-array beam-forming network is in digital form.

25. A phased array antenna according to claim 9, wherein both the main beam-forming network and the sub-array beam-forming network are in analog form.

26. A phased array antenna according to claim 9, wherein the phased array antenna has a transmit function, and for each sub-array, said sub-array beam-forming network includes, a signal distribution means coupled to an input port of the sub-array for providing the element signals of the sub-array.

27. A phased array antenna according to claim 26, including a respective digital beam-forming network for each of a plurality (K) of communications channels, and arranged to apply a complex weight to each said channel signal, digital to analog means for each channel signal for converting the channel signal to analog form, and multiplexing means for combining said channel signals, and coupled to each said input port.

28. An optimisation process for determining beam-forming parameters of a phased array antenna, the antenna providing coverage over a predefined geographical region, and a plurality of beams within said region, the antenna having a plurality of antenna elements, each antenna element providing an antenna element signal having a phase relationship and an amplitude relationship to the other element signals, and the antenna elements being partitioned into a plurality of overlapping sub-arrays, each sub-array comprising a subset of all the antenna elements of the phased array, and at least some of the antenna elements participating in more than one sub-array, the optimisation process comprising:
  setting intra sub-array beam-forming weights allocated to each sub-array are set to initial values;
  determining in which main beam-forming weight values allocated to said sub-arrays are determined, to provide values of directivity at the locations of at least some of said beams; and
  changing, in iterations, the values of said intra sub-array beam-forming weights and determining at each iteration main beam-forming weight values allocated to said sub-arrays, until a desired level of said directivity for said beams is attained.

29. An optimisation process according to claim 28, wherein said main beam-forming weight values are determined to provide peak values of directivity at said locations.

30. An optimisation process according to claim 28, including determining overall antenna size based on spot beam directivity requirement.

31. An optimisation process according to claim 28, including determining individual element size/spacing based on size of grating lobe exclusion zone.

32. An optimisation process according to claim 28, including determining spacing of the ports of said sub-arrays from maximum size of said region.

33. An optimisation process according to claim 28, including determining size of sub-arrays and extent of overlaps by iteration of the process of claim 28.

34. An optimisation process according to claim 28, wherein initial weights within each sub-array are set as either all equal or to maximise a desired sub-array directivity in said region.

35. An optimisation process according to claim 28, including a further optimisation wherein said main beam-forming weights are optimised against a target combining edge-of-beam directivity and side lobe levels.

* * * * *